(12) United States Patent
Osterloh et al.

(10) Patent No.: US 9,286,321 B2
(45) Date of Patent: Mar. 15, 2016

(54) SYSTEMS AND METHODS FOR PROVIDING AN AUTOMATED VALIDITY CHECK OF TRANSACTIONAL DATA POSTINGS

(71) Applicant: SAP SE, Walldorf (DE)

(72) Inventors: Martin Osterloh, Leimen (DE); Thomas Schachner, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/947,290

(22) Filed: Jul. 22, 2013

(65) Prior Publication Data

US 2013/0304715 A1 Nov. 14, 2013

Related U.S. Application Data

(62) Division of application No. 11/604,357, filed on Nov. 27, 2006, now Pat. No. 8,495,040.

(30) Foreign Application Priority Data

Nov. 25, 2005 (EP) .................................... 05111312

(51) Int. Cl.
*G06F 9/54* (2006.01)
*G06F 17/30* (2006.01)
*H04L 29/08* (2006.01)

(52) U.S. Cl.
CPC ............ *G06F 17/30227* (2013.01); *G06F 9/54* (2013.01); *G06F 2209/541* (2013.01); *H04L 67/02* (2013.01)

(58) Field of Classification Search
CPC ................................................ G06F 17/30351
USPC ........................................................ 707/701
See application file for complete search history.

(56) References Cited

U.S. PATENT DOCUMENTS

| | | |
|---|---|---|
| 5,424,938 A | 6/1995 | Wagner et al. |
| 6,044,382 A | 3/2000 | Martino |
| 6,535,883 B1 | 3/2003 | Lee et al. |
| 6,625,602 B1 | 9/2003 | Meredith et al. |
| 6,915,454 B1 | 7/2005 | Moore et al. |

(Continued)

FOREIGN PATENT DOCUMENTS

| | | |
|---|---|---|
| EP | 0 869 448 A1 | 10/1998 |
| JP | 63 075938 A | 4/1988 |
| JP | 01 007155 A | 1/1989 |

OTHER PUBLICATIONS

European Communication and Search Report for EP 05111312.4, dated Mar. 22, 2006 (6 pages).

Primary Examiner — James E Richardson
(74) Attorney, Agent, or Firm — Dilworth IP LLC

(57) ABSTRACT

Systems and methods are provided for providing an automated validity check of transaction data postings. In one implementation, a method is provided that includes entering at least one code for specifying at least one posting to be performed for a transactional data processing operation. The method may also include starting the transactional data processing operation, sending a request to a service component for performing a validity check of the at least one code, buffering one or more posting requests resulting from execution of the transactional data processing operation. Further, the method may include sending, in response to receipt of a first signal indicative of code validity from the service component, the one or more buffered posting requests with the at least one code to a posting component.

9 Claims, 5 Drawing Sheets

(56) References Cited

U.S. PATENT DOCUMENTS

| | | |
|---|---|---|
| 2002/0076055 A1 | 6/2002 | Filipi-Martin et al. |
| 2002/0111844 A1 | 8/2002 | Vanstory et al. |
| 2003/0046194 A1 | 3/2003 | McClendon et al. |
| 2003/0069844 A1 | 4/2003 | Koren |
| 2003/0078798 A1 | 4/2003 | Zaks et al. |
| 2003/0093690 A1* | 5/2003 | Kemper ............... 713/201 |
| 2003/0217005 A1 | 11/2003 | Drummond et al. |
| 2005/0234752 A1 | 10/2005 | Hinman |
| 2005/0278587 A1 | 12/2005 | Breitling et al. |
| 2006/0129461 A1 | 6/2006 | Pankl et al. |
| 2006/0135135 A1* | 6/2006 | Rybak ............... 455/414.1 |
| 2006/0136454 A1* | 6/2006 | Tchouati et al. ............ 707/101 |
| 2007/0239791 A1* | 10/2007 | Cattell et al. ............ 707/200 |

\* cited by examiner

SYSTEMS AND METHODS FOR PROVIDING AN AUTOMATED VALIDITY CHECK OF TRANSACTIONAL DATA POSTINGS

CROSS REFERENCE TO RELATED APPLICATIONS

This is a division of U.S. application Ser. No. 11/604,357, filed Nov. 27, 2006 (now allowed), and claims the benefit of European Patent Application No. 05111312.4, filed Nov. 25, 2005, both of which are expressly incorporated herein by reference.

TECHNICAL FIELD

The present invention generally relates to the field of data processing. More specifically, the invention relates to systems and methods for providing an automated validity check for transactional data postings.

BACKGROUND INFORMATION

Today, enterprises of all sizes, from small retailers to giant banks, use transaction processing to control and manage the vital functions of their businesses. In the context of transaction processing, an application program may be used to implement a particular business function, for example, a payroll application or an order entry application. Commercial application programs typically process many similar items, for example, orders in an order processing system, seat reservations in an airline booking system, or credit queries in a credit control system.

In a transaction processing system, one execution of an application program usually processes a single transaction. End users have on-line access to the system and to enterprise data, and directly initiate transactions. In a transaction processing environment, many users repeatedly process similar transactions, and require a fast response to each transaction. Examples of such users are order entry clerks, airline reservation clerks, and bank tellers. Transaction processing systems are also referred to as online transaction processing systems (OLTPs).

Typically, a transaction results in one or more postings. Each posting is encoded using one or more predefined codes that specify the posting, such as a business area code, asset code, cost center code, order code, or profit center code. If the code entered by a user is invalid, the respective postings have to be corrected in retrospect. This may require reversing the incorrect postings and generating corrected postings. Such a correction may be extremely costly in terms of the data processing resources required for the reversing and correcting of postings. In particular, this may negatively impact response times of the transaction processing system, especially if the correction is to be performed while the loading of the transaction processing system is high.

SUMMARY

In accordance with the principles of the present invention, as embodied and broadly described herein, systems, methods, and computer program products are provided for automating validity checks of transactional data postings.

In accordance with an embodiment of the present invention, there is provided a data processing method comprising entering at least one code for specifying at least one posting to be performed for a transactional data processing operation, starting the transactional data processing operation, sending a request to a service component for performing a validity check of the at least one code, buffering one or more posting requests resulting from execution of the transactional data processing operation, and in response to receipt of a first signal indicative of code validity from the service component, sending the one or more buffered posting requests with the at least one code to a posting component.

Embodiments of the present invention may facilitate the checking of codes before the respective postings are made without delaying transactional data processing. The transactional data processing and the code check may be performed asynchronously such that the transactional data processing operation may start even if the code check has not been completed. This may be accomplished by buffering posting requests resulting from execution of the transactional data processing while the code checking is performed. After successful completion of the code check, the buffered posting requests may be executed using the at least one code. This ensures that only valid codes are used for the postings.

In accordance with another embodiment of the invention, posting requests that are consecutive to receipt of a validity signal indicating code validity are directly sent to a posting component without buffering.

In accordance with a further embodiment of the invention, a user is prompted to enter a correction of a previously entered code in response to receipt of a signal indicating code invalidity. After the user has entered a code correction, a new request is sent to the service component for checking validity of the corrected code. As long as no validity signal has been received, posting requests are continued to be buffered in order to avoid incorrect postings using the invalid code.

In accordance with a further embodiment of the invention, the service component that performs the code check is implemented as a web service. In this case, the request for performing the validity check may be sent as a so-called SOAP message.

In accordance with a further embodiment of the invention, the code check is performed by comparing the code to be checked for validity with predefined valid codes and/or predefined valid code ranges.

In accordance with a further embodiment of the invention, a user interface is provided for entry of transactional data and entry of the at least one code. The transactional data processing and the sending of the request for the code checking are typically initiated by selecting an enter button.

Embodiments of the present invention further relate to computer program products that has computer executable instructions for performing data processing methods consistent with the invention. In one embodiment, a computer program product is provided that is implemented as a transactional application program that comprises instructions for initiating the code checking and buffering of the posting requests during the ongoing code checking operation.

Embodiments of the present invention also relate to a data processing system comprising a user interface for entering at least one code, the code specifying at least one posting to be performed for a transactional data processing operation, an application program for performing the transactional data processing operation, a network interface for sending a request for performing a validity check of the at least one code to a service component, a buffer memory for buffering one or more posting requests resulting from execution of the transactional data processing operation, and program instructions for sending the one or more buffered posting requests to a posting component via the network in response to receipt of a first signal indicative of code validity from the service component.

In accordance with a further embodiment of the invention, the data processing system implements a web service for providing the transactional data processing service for a number of users.

In accordance with another embodiment of the invention, the data processing system stores data descriptive of a set of data entry fields for code entries and configuration data descriptive of a sub-set of these data entry fields. Only data entry fields of the sub-set specified by the configuration data are displayed on the user interface. This can facilitate the provision of a common look-and-feel of the user interfaces of various application programs as the user interfaces of all application programs are based on the same set of data entry fields as far as entry of the codes is concerned.

Additional embodiments of the present invention relate to web services for performing code validity checks. In one embodiment, a web service is provided that comprises means for receiving a request for performing a validity check of at least one code from a transactional data processing system, the at least one code specifying at least one posting to be performed for a transactional data processing operation, means for checking the validity of the at least one code, means for generating a first signal indicative of code validity and for generating a second signal indicative of code invalidity, and means for sending a response to the transactional data processing system carrying the first or the second signal depending on the result of the validity check.

In accordance with an embodiment of the invention, the web service forms an integral part of an accounting data processing system. Alternatively, the web service is closely or loosely coupled to the accounting data processing system.

Usage of web service technology for implementation of the code checker functionality can facilitate the provision of a central "hub" that may be used by various transactional application programs that may be distributed within an organization.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, show features of implementations consistent with the present invention and, together with the description, help explain principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
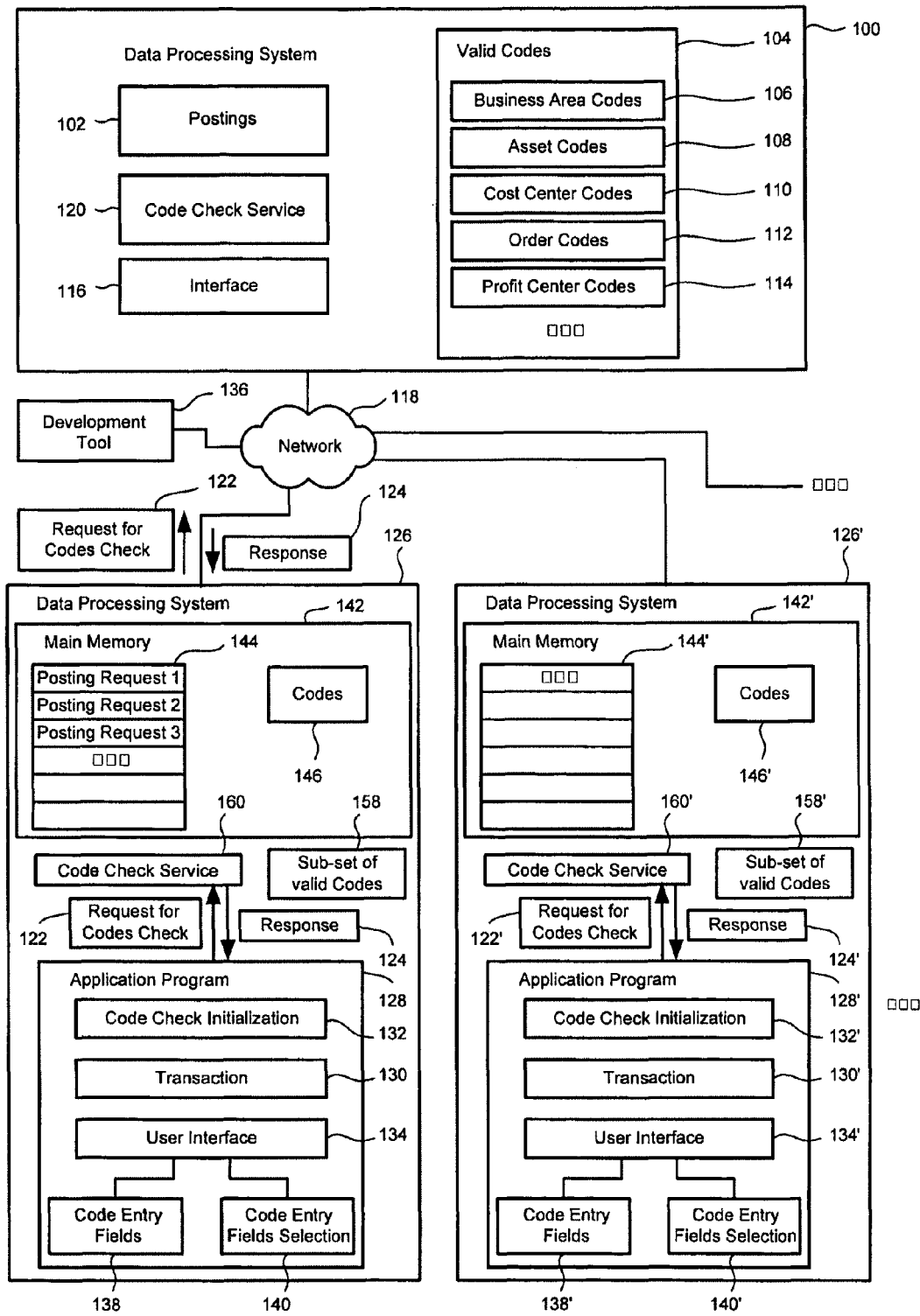
FIG. 1 illustrates a block diagram of an exemplary data processing system, consistent with certain aspects of the present invention.

FIG. 1 shows an exemplary data processing system 100 that implements a service for checking the validity of codes. By way of example, the data processing system 100 is an accounting system that has at least one electronic ledger 102 for holding various postings. The postings are performed using valid codes as specified in a memory 104 of the data processing system 100. The memory 104 may explicitly specify each valid code and/or it may specify valid codes by defining valid code ranges. For example, the memory 104 has a memory portion 106 for storing valid business area codes, a memory portion 108 for storing valid asset codes, a memory portion 110 for storing valid cost center codes, a memory portion 112 for storing valid order codes, a memory portion 114 for storing valid profit center codes, etc.

The data processing system 100 has an interface 116 for coupling the data processing system 100 to a network 118. The network 118 may be based on the TCP/IP protocol or another network technology.

The data processing system 100 may execute program instructions 120 for performing a validity check in response to a request 122 received by the interface 116 via the network 118. The request 122 carries one or more codes that need to be checked for validity. Receipt of the request 122 invokes execution of the program instructions 120 by the data processing system 100 such that each code identified in the request 122 is compared with respective valid codes specified in the memory 104. If all codes identified in the request 122 are valid, a response 124 is generated by the program instructions 120, wherein the response 124 carries a signal indicating the validity of the codes. Otherwise, the response 124 carries a signal that indicates invalidity of one or more of the codes identified in the request 122.

A data processing system 126 is also coupled to the network 118. The data processing system 126 may execute an application program 128 for performing a transactional data processing operation, such as vendor invoice entry, purchase order entry, goods movement entry, entry of an order for an account transfer, entry of an airline reservation, or the like.

The application program 128 may belong to a distributed enterprise resource planning (ERP) system. For example, the application program 128 may constitute a module of the ERP system for logistics, such as supply chain management, production planning, distribution, quality management, service management, project planning, human resources, or the like. The application program 128 has instructions 130 for execution of at least one respective transactional data processing operation. Further, the application program 128 has instructions 132 for code check initialization and instructions 134 for providing a user interface that enables a user to enter transactional data and one or more codes.

In order to provide a common look-and-feel of the various modules of the ERP system, the available code entry fields are defined by means of a development tool 136 that is coupled to the network 118. The development tool 136 may generate data 138 that specifies all available code entry fields. The data 138 is sent from the development tool 136 to the data processing system 126.

However, not all defined code entry fields are required for each module of the ERP system. In order to limit the number of code entry fields provided by the user interface, a sub-set of the code entry fields may be specified by configuration data 140 of the application program 128. For example, the configuration data 140 may be stored as customizing data in the data processing system 126.

The data processing system 126 has a main memory 142 for providing a buffer memory 144 for buffering posting requests generated by the program instructions 130. Further, the main memory 142 may store one or more codes 146 that have been entered by a user via the user interface.

One or more additional data processing systems 126' that are of a similar design as data processing system 126, may be coupled to the data processing system 100 via the network 118 for access to the code check service provided by the data processing system 100 and the ledger 102. For example, data processing system 126 may implement a human resources module of the ERP system, while data processing system 126' may implement a supply chain management module of the ERP system.

In the following, operation of the data processing system 126 is considered without restriction or generality. The functionalities provided by the data processing system 126 may also be implemented in the other data processing systems, such as data processing system 126' of the ERP system in the same or a similar way.

In operation, a user may initiate a transactional data processing operation by entry of transactional data and codes 146. Entry of the transactional data and the codes 146 may invoke the program instructions 130 for execution of the requested transactional data processing operation. In addition, the program instructions 132 are invoked for checking the validity of the codes 146. The program instructions 132 generate the request 122 containing the codes 146.

The request 122 is sent from the data processing system 126 to the data processing system 100 via the network 118. Receipt of the request 122 by the data processing system 100 may invoke the program instructions 120. By execution of the program instructions 120, the codes 146 are compared with respective valid codes as specified in the memory 104. The program instructions generate a respective response 124 that signals the validity or invalidity of the codes 146 depending on the result of the code check.

The execution of the transactional data processing operation by the program instructions 130 does not need to be delayed until the response 124 signaling validity of the codes 146 is received. Rather, the transactional data processing operation may be executed without delay immediately after the transactional data processing operation has been invoked by the user entry. Posting requests, such as posting request 1, 2, 3, . . . , that are generated by the program instructions 130 during the ongoing code check by the program instructions 120 are buffered in the buffer 144.

When a response 124 is received signaling validity of the codes 146, the buffer 144 is emptied by sending the buffered posting requests 1, 2, 3, . . . from the data processing system 126 to the data processing system 100 together with the codes 146 such that the posting requests 1, 2, 3, . . . are executed by the data processing system 100 and posted to the ledger 102. Posting requests generated by the program instructions 130 after receipt of the response 124 signaling validity of the codes 146 do not need to be buffered in the buffer 144, but may be sent from the data processing system 126 to the data processing system 100 without delay.

It is to be noted that the code check may be implemented using synchronous communication between the data processing system 126 and the data processing system 100. That is, a communication channel may be established and maintained for transmission of the request 122 and the response 124 between the data processing system 126 and the data processing system 100. The transmission of the posting requests carrying transactional data to be posted may also be performed asynchronously from the data processing system 126 to the data processing system 100.

Further, it is to be noted that some of the codes may be checked locally by the code check service. For this purpose, a sub-set of the valid codes is stored in a database 158 of the data processing system 126. Further, the data processing system 126 has program instructions 160 for execution of a local code check.

The request 122 may be intercepted by means of the program instructions 160. For codes that are not contained in the database 158, the request 122 is forwarded to the data processing system 100 in order to obtain response 124. For codes that are contained in the database 158, the instructions 160 perform the code check locally using the sub-set of the valid codes stored in the database 158. If the code check is only to be performed for codes that are contained in the database 158, the request 122 does not need to be forwarded to the data processing system 100. In this case the response 124 is solely generated by the program instructions 160. This may substantially accelerate the code checking. Only if the code check is to be performed for a code that does not belong to the sub-set of valid codes contained in the database 158, the request to perform that code check needs to be forwarded to the data processing system 100 via the network 118.

In one embodiment, the program instructions 120 are implemented as a web service while the program instructions are executed locally by the data processing system 126. In other words, the code check service may be implemented by a local program component comprising the program instructions 160 and a central web service comprising program instructions 120. The local program component may use a local database containing a sub-set of the valid codes, whereas the central web service may use a database (cf. memory 104) that contains another sub-set of the valid codes or all valid codes for the performance of the respective code checks.

The buffering of requests in buffer memory 144 may only be useful for such requests that are forwarded to the data processing system 100, for example, a central web service, as requests that are processed locally may be executed immediately without buffering.

Figure 2:
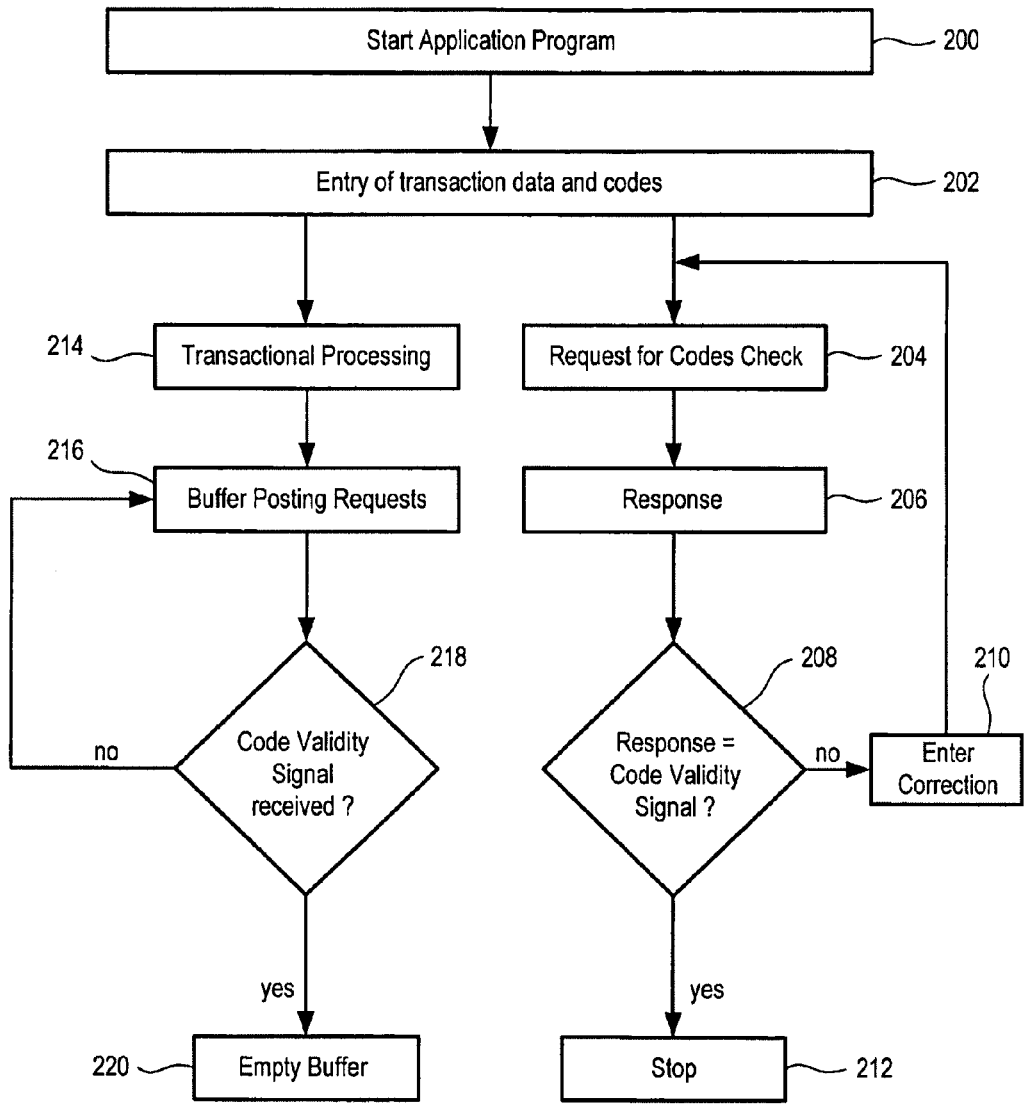
FIG. 2 illustrates a flowchart of an exemplary data processing method, consistent with certain aspects of the present invention.

FIG. 2 illustrates a flowchart of an exemplary method for performing the validity check of codes, consistent with certain aspects of the present invention. In step 200, an application program is started. In step 202, a user initiates a transaction by entry of transaction data and respective codes. In response, a request for checking the codes is generated in step 204 and sent to a central code checker. The code checker generates a response that is received in step 206.

In step 208, it is determined whether the response carries a code validity signal. If the response does not indicate code validity, but rather code invalidity, the control goes to step 210 where the user is prompted to enter a correction of the one or more invalid codes. After entry of the correction, the control goes from step 210 back to step 204. If the response indicates code validity, the code check has been successfully completed and is stopped in step 212.

As shown in FIG. 2, while steps 204 to 212 are executed, the requested transactional data processing operation may be executed asynchronously and independently in step 214. Posting requests that are generated by the execution of the transactional data processing are buffered in step 216 until it is determined in step 218 that the code validity signal has been received. In response to the code validity signal, the control goes to step 220, where the buffer is emptied by sending the buffered posting requests together with the valid codes to the accounting system for posting to one of the electronic ledgers.

Figure 3:
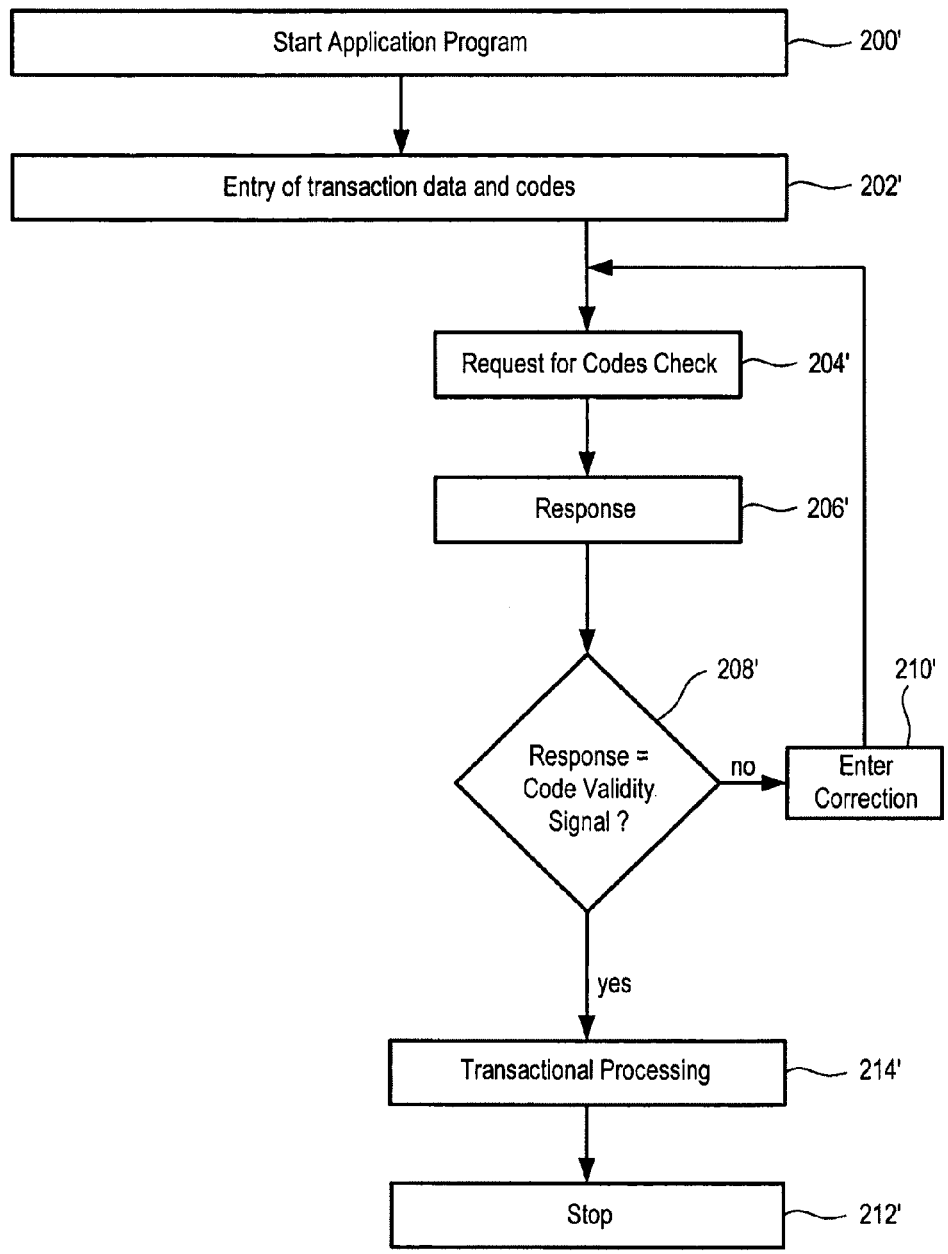
FIG. 3 illustrates a flowchart of another exemplary data processing method, consistent with certain aspects of the present invention.

FIG. 3 illustrates a flowchart of another exemplary method for performing the validity check of codes, consistent with certain aspects of the present invention. In FIG. 3, steps similar to those of FIG. 2 are designated by primed reference numerals. In contrast to the embodiment of FIG. 2, the transaction processing step 214' is only started after the code check has been performed successfully in the preceding steps, for example, steps 204' to 210'. As a consequence, buffering is not required in this embodiment.

In the embodiment considered here, the code check is implemented using synchronous communication between the data processing system 126 and the data processing system 100 (cf. FIG. 1). That is, a communication channel may be established and maintained for transmission of the request for codes check (step 204') and receipt of the response (step 206').

Figure 4:
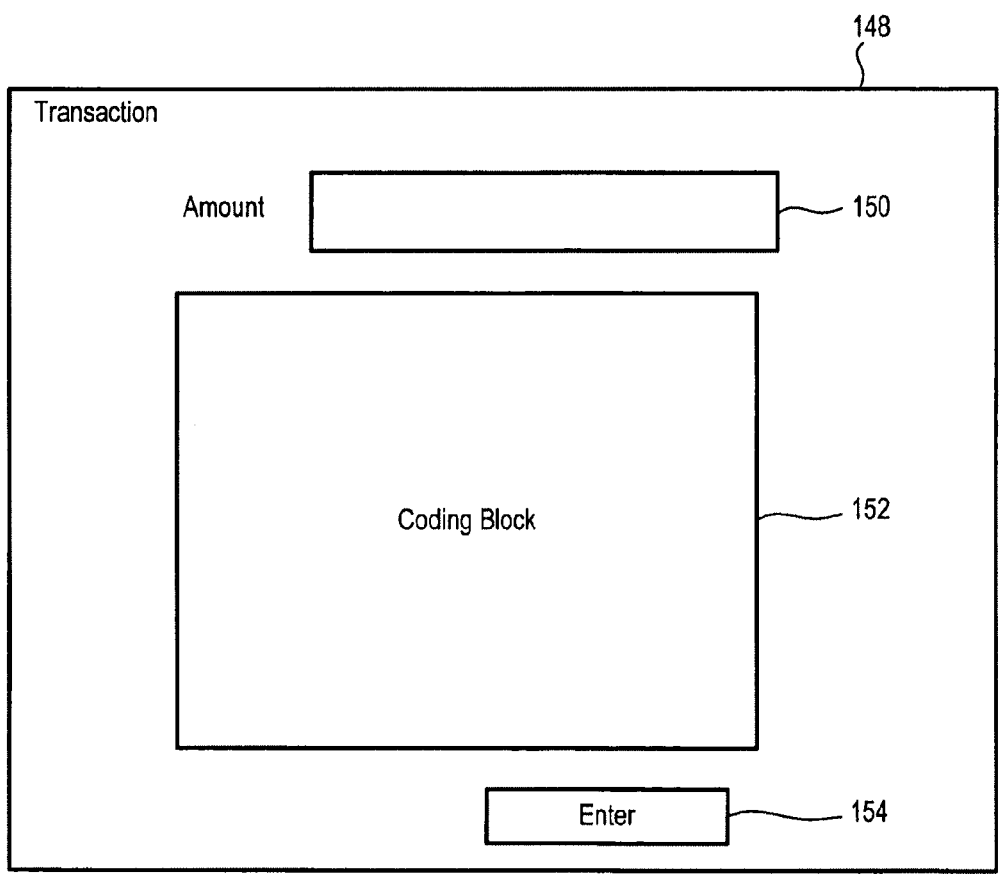
FIG. 4 is a graphical representation of an exemplary user window interface, consistent with certain aspects of the present invention.

FIG. 4 shows a window 148 of an exemplary user interface of one of the application programs, such as application program 128 of FIG. 1. The window 148 has a data entry field 150 for entry of transactional data, such as a monetary amount (e.g., a monthly salary). Further, the window 148 has a so-called coding block 152 containing a number of data entry fields for entry of codes. By operating an entry button 154, the user may submit the transaction data and the codes entered into the data entry field 150 and the coding block 152, respectively, to the data processing system. The data entry fields of the code block 152 are specified by the data 138 and the configuration data 140 as explained above with respect to FIG. 1.

Figure 5:
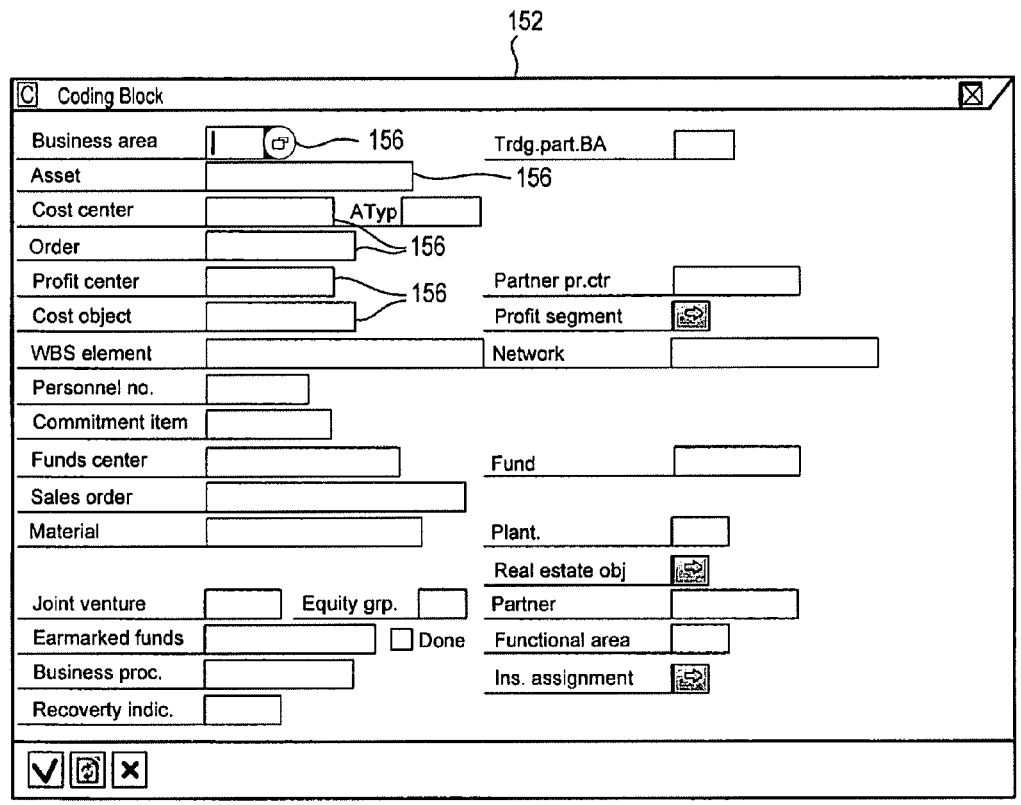
FIG. 5 is a graphical representation of an exemplary code block window interface, consistent with certain aspects of the present invention.

FIG. 5 shows a more detailed implementation of the coding block 152. As shown in the example of FIG. 5, the coding block 152 has a number of data entry fields 156, such as for entry of a code identifying a business area, an asset, a cost center, an order, a profit center, a cost object, and various other business objects related to the user initiated transaction. The codes entered into the coding block 152 may be posted together with the transactional data in the accounting system as a result of the execution of the transaction.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A system for code validation, comprising:
a local data processing system comprising:
a first memory for buffering one or more posting requests; and
first program instructions for performing a local validity check of at least one code, wherein performing the local validity check comprises:
comparing the at least one code to a first set of valid codes stored in a local database; and
if the at least one code is not included in the first set of valid codes stored in the local database, sending a request to a remote data processing system to perform a remote validity check of the at least one code,
and wherein if the request is sent to the remote data processing system to perform the remote validity check of the at least one code the, first program instructions perform a buffering of the one or more posting requests in the first memory,
wherein the buffering is performed asynchronously and independently from the performance of the local validity check;
second program instructions for sending the one or more buffered posting requests to a posting component via a network in response to receipt of a first signal indicative of code validity, if the at least one code is not included in the first set of valid codes stored in the local database; and
third program instructions for sending the one or more posting requests to the posting component via the network, without buffering the one or more posting requests, in response to receipt of the first signal indicative of code validity, if the at least one code is included in the first set of valid codes stored in the local database; and
the remote data processing system comprising:
a second memory storing a second set of valid codes; and
fourth program instructions for performing the remote validity check of at least one code, wherein performing the remote validity check comprises:
receiving the request for performing the remote validity check of the at least one code from the local data processing system;
comparing the at least one code set of valid codes;
sending the first signal indicative of code validity to the local data processing system if the at least one code is included in the second set of valid codes; and
sending a second signal indicative of code invalidity to the local data processing system if the at least one code is not included in the second set of valid codes.

2. The system of claim 1, wherein the at least one code specifies at least one posting to be performed by a posting component for a transactional data processing operation on transactional data, the transactional data relating to a transaction, wherein the transactional data is separate from the at least one code and the at least one code relates to at least one business object and the business object comprises at least one of a business area, an asset, a cost center, an order, a profit center, and a cost object.

3. The system of claim 2, further comprising a plurality of codes, each of the codes relating to at least one business object.

4. The system of claim 2, wherein the transactional data processing operation is performed at the same time as the local validity check.

5. The system of claim 2, wherein each posting request comprises a request to post the at least one code and the transaction data to an accounting system.

6. The system of claim 2, further comprising providing a user interface comprising a first data entry field for entry of the transactional data, a second data entry field for entry of the at least one code, and an enter button, wherein the execution of the transactional data processing operation and the sending of the request are initiated by a user's selection of the enter button.

7. The system of claim 1, wherein the local data processing system comprises a web service.

8. The system of claim 1, wherein the second data processing system comprises an ERP system.

9. The system of claim 1, wherein the second data processing system comprises an accounting system as part of an ERP system.

* * * * *